United States Patent
Marques Lito Velez Grilo

(10) Patent No.: US 12,084,202 B2
(45) Date of Patent: Sep. 10, 2024

(54) SOUND INSULATING PANEL SUITABLE FOR USE AS A DEFLECTING SURFACE IN JET BLAST DEFLECTORS

(71) Applicant: VALIS-ENGENHARIA E INOVAÇÃO, S.A., Caldas Da Rainha (PT)

(72) Inventor: Vasco Maria Marques Lito Velez Grilo, Caldas Da Rainha (PT)

(73) Assignee: VALIS-ENGENHARIA E INOVAÇÃO, S.A., Caldas da Rainha (PT)

( * ) Notice: Subject to any disclaimer, the term of this patent is extended or adjusted under 35 U.S.C. 154(b) by 505 days.

(21) Appl. No.: 17/603,709

(22) PCT Filed: Apr. 29, 2019

(86) PCT No.: PCT/PT2019/050008
§ 371 (c)(1),
(2) Date: Oct. 14, 2021

(87) PCT Pub. No.: WO2020/222667
PCT Pub. Date: Nov. 5, 2020

(65) Prior Publication Data
US 2022/0194626 A1 Jun. 23, 2022

(51) Int. Cl.
*B64F 1/26* (2006.01)
*G10K 11/162* (2006.01)
(52) U.S. Cl.
CPC .............. *B64F 1/26* (2013.01); *G10K 11/162* (2013.01)
(58) Field of Classification Search
CPC ................................ B64F 1/26; G10K 11/162

USPC ......................................................... 181/210
See application file for complete search history.

(56) References Cited

U.S. PATENT DOCUMENTS

| | | | | |
|---|---|---|---|---|
| 3,037,726 A | * | 6/1962 | Phillips | B64F 1/26 256/12.5 |
| 5,127,609 A | * | 7/1992 | Lynn | B64F 1/26 256/12.5 |
| 5,429,324 A | * | 7/1995 | Lynn | B64F 1/26 244/114 B |
| 5,856,640 A | | 1/1999 | Lynn | |

(Continued)

FOREIGN PATENT DOCUMENTS

| | | |
|---|---|---|
| CN | 107604832 A | 1/2018 |
| KR | 20100120109 A * | 11/2010 |
| KR | 101360398 B1 * | 2/2014 |

OTHER PUBLICATIONS

English translation for KR 101360398 B1, accessed May 7, 2024 via Espacenet, <https://worldwide.espacenet.com/patent/search/family/050270324/publication/KR101360398B1?q=pn%3DKR101360398B1> (Year: 2014).*

*Primary Examiner* — Jeremy A Luks
(74) *Attorney, Agent, or Firm* — Rivka Friedman

(57) ABSTRACT

The present application relates to a sound insulating panel, suitable for use as a deflecting surface in jet blast deflectors. Therefore, it is described a jet blast deflector fence, comprised of detachable sound insulating panels, forming a modular deflecting and noise absorbing surface, covering its entire frontal area that is aligned with the aircraft. This approach favours not only the maintenance procedures of the fence, but also allows noise absorption, in addition to redirecting the high energy exhausted from a jet engine.

14 Claims, 4 Drawing Sheets

(56) References Cited

U.S. PATENT DOCUMENTS

| | | | |
|---|---|---|---|
| 6,802,477 B2 * | 10/2004 | Campion | B64F 1/26 114/261 |
| 2007/0056224 A1 | 3/2007 | Meisel | |
| 2007/0131480 A1 | 6/2007 | Corbin et al. | |
| 2010/0243369 A1 | 9/2010 | Fusiek et al. | |

* cited by examiner

SOUND INSULATING PANEL SUITABLE FOR USE AS A DEFLECTING SURFACE IN JET BLAST DEFLECTORS

FIELD OF THE INVENTION

The present invention falls within the scope of safety and soundproofing structures for aircrafts, typically existing in airports or in any infrastructures for aircrafts.

Particularly, the present invention relates to a jet blast deflector fence for upwardly deflecting the horizontal blasts of aircrafts to prevent damage or injury. More particularly the present invention pertains to a completely different approach for jet blast deflector fences, composed of detachable sound insulating panels, forming a modular deflecting and noise absorbing surface, which covers its entire frontal area that is aligned with the aircraft. This favours not only the maintenance procedures of the fence, but also allows noise absorption, in addition to redirecting the high energy exhausted from a jet engine.

PRIOR ART

The patent application U.S. Pat. No. 5,127,609 discloses a jet blast deflector fence comprised of simple frames which include only two structural members, a curved rib channel member securely and hingedly attached to an airport apron and a vertical King post of angle iron which is rigidly secured at its lower end and hingedly attached at its upper end to the channel. A corrugated deflection surface, of only one piece, overlies and is fastened to the curved rib members. One or more ventilating slots are included to reduce turbulence in order to improve deflection performance.

The patent application CA2564745 discloses a jet blast wall structure comprised of a plurality of panels, each of which has a front panel face and edge frame members at each side of the front panel face to which the front panel face is secured. All components, including each front panel face is made substantially of fiberglass, and each edge frame member and each bolt or nut, used for production of the structure is also made from fiberglass.

The patent application U.S. Pat. No. 5,429,324A discloses a jet blast deflector fence which is composed of two curved deflectors, a front, taller deflector surface, and a rear, shorter deflector surface. Both of the deflector surfaces are supported by the same support structure. The front deflector surface includes an opening between the surface of the apron and the leading edge of the deflector surface that is approximately one-quarter of the height of that deflector surface. The opening allows passage of and separates the highest velocity component of the jet blast and directs it to the concave forward surface of the rear deflector, the leading edge of which is at ground level. The concave rear surface guides the higher velocity components of the jet blast from a horizontal to a vertical direction.

The patent application U.S. Pat. No. 6,802,477 describes a jet blast deflector adapted for location on a sea vessel. The jet blast deflector is configurable such that in use the jet blast deflector deflects eflux created by the blast of a jet engine of an aircraft downwardly and beneath the deck of a vessel.

The existing solutions of the state of the art, such as those described herein, disclose different structural arrangements for a jet blast deflector, however none of them seems to go beyond a domain of structural configuration, which constitutes a limitation in what concerns to the performance and functionalities that such apparatus can achieve.

The present solution intended to innovatively overcome such issue by disclosing a new concept of jet blast deflectors, as will be described below.

Solved Technical Problems

This invention was aimed at solving the problem associated with the performance and functionality of a jet blast deflector apparatus, particularly in what concerns to the inadequacy of the known structures for providing noise absorption, in addition to redirecting the high energy exhausted from a jet engine.

SUMMARY OF THE INVENTION

It is therefore an object of the present invention to describe a jet blast deflector fence, comprised of sound insulating panels, forming a modular deflecting and noise absorbing surface, covering its entire frontal area that is aligned with the aircraft.

In an advantageous configuration of a sound insulating panel of the present invention, it is suitable for use as a deflecting surface in jet blast deflectors, and it is comprised by a C-shaped sheet, with a perforated central portion, and by a capsule, containing a sound insulator material that is designed to fit inside said C-shaped sheet.

In an advantageous configuration of the jet blast deflector fence of the present invention, it is comprised by a plurality of detachable sound insulating panels, and by a deflector framework where the panels are installed, providing noise absorption capabilities to the jet blast deflector fence, in addition to redirecting the high energy exhausted from a jet engine. Also, the sound insulating panels being detachable from said fence structure favours the maintenance procedures.

Figure 1:
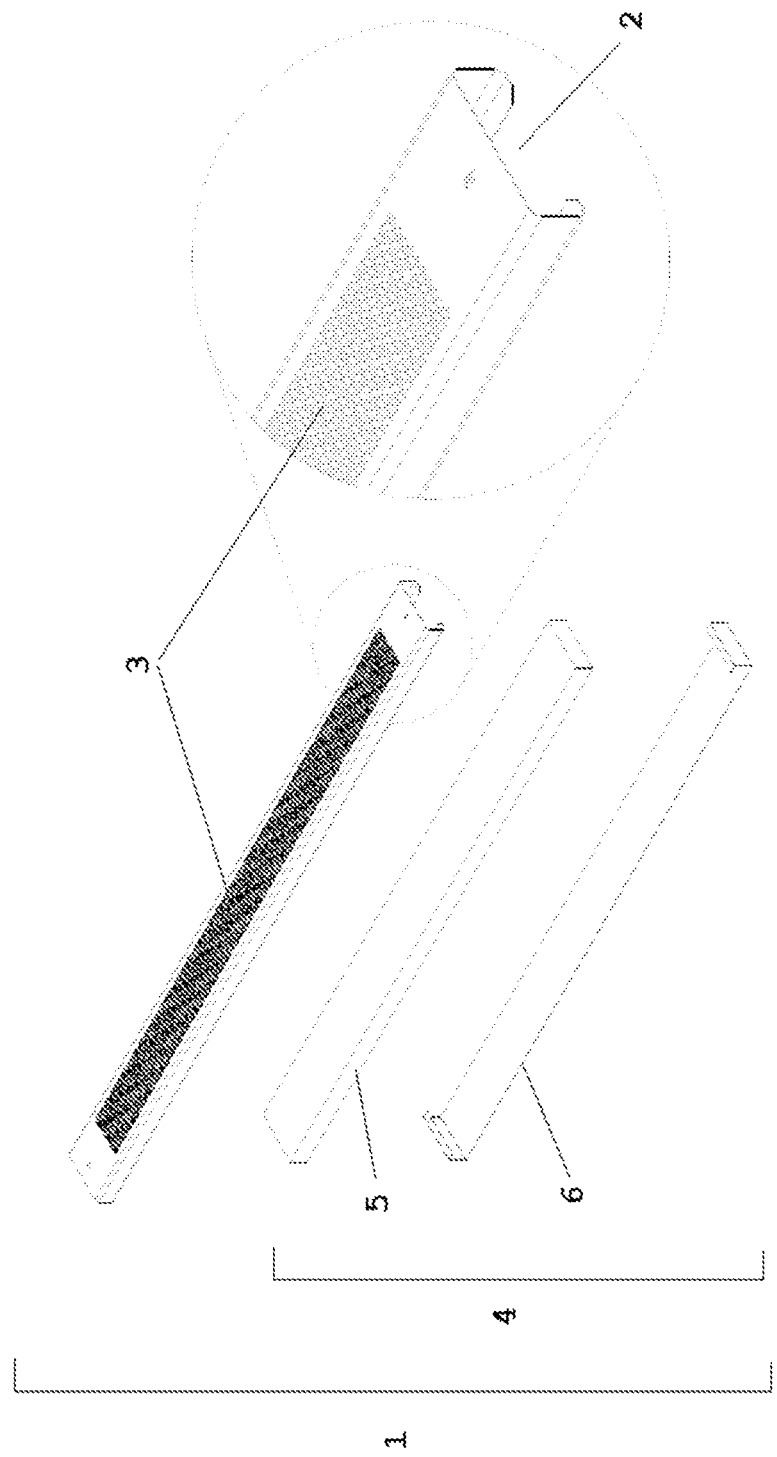
FIG. 1—representation of an embodiment of the sound insulating panel of the present invention. The reference signs represent:
1—sound insulating panel;
2—C-shaped sheet;
3—perforated area of the C-shaped sheet's central portion;
4—capsule;
5—sound insulator material;
6—rear sheet.
Figure 2:
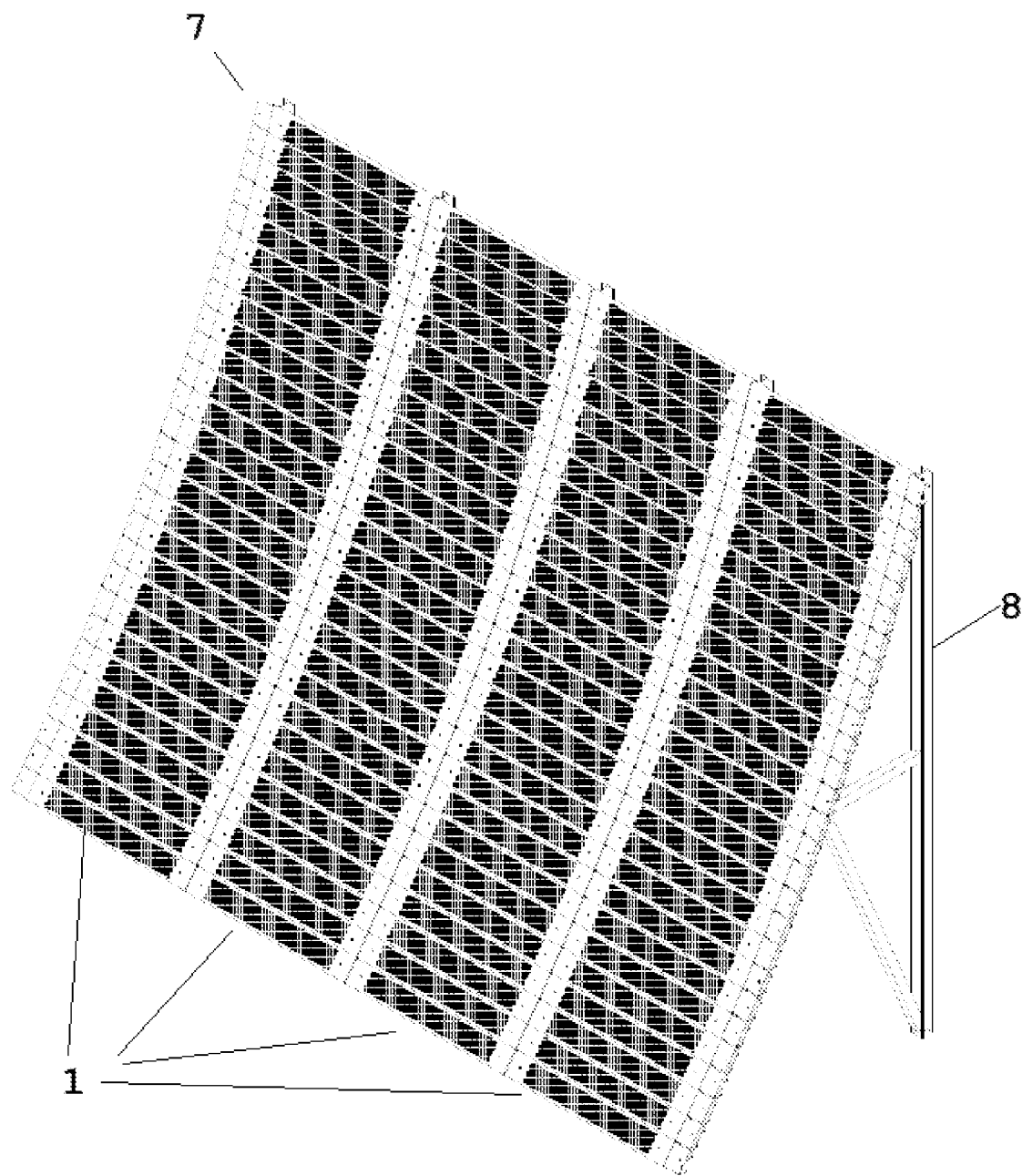
FIG. 2—representation of an embodiment of the jet blast deflector fence of the present invention. The reference signs represent:
1—sound insulating panel;
7—jet blast deflector fence;
8—vertical post.
Figure 3:
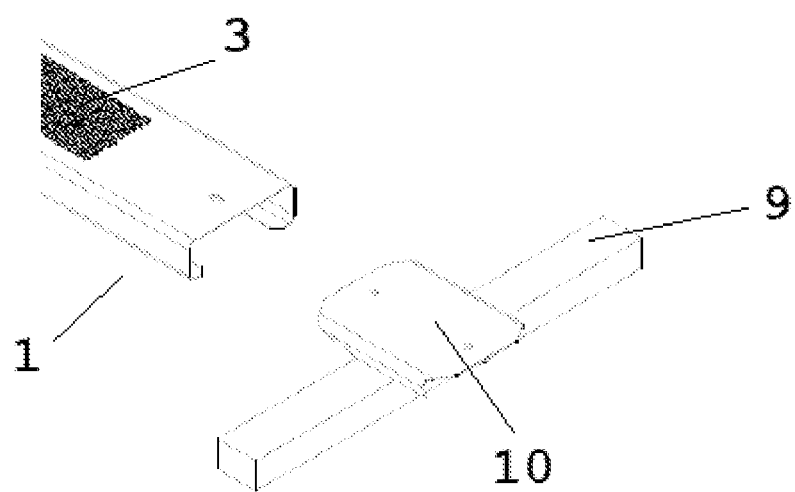
FIG. 3—representation of the connection mechanism for installing a sound insulation panel in the fence structure. The reference signs represent:
1—sound insulating panel;
3—perforated area of the C-shaped sheet's central portion;
9—rail channels;
10—rabbet.
Figure 4:
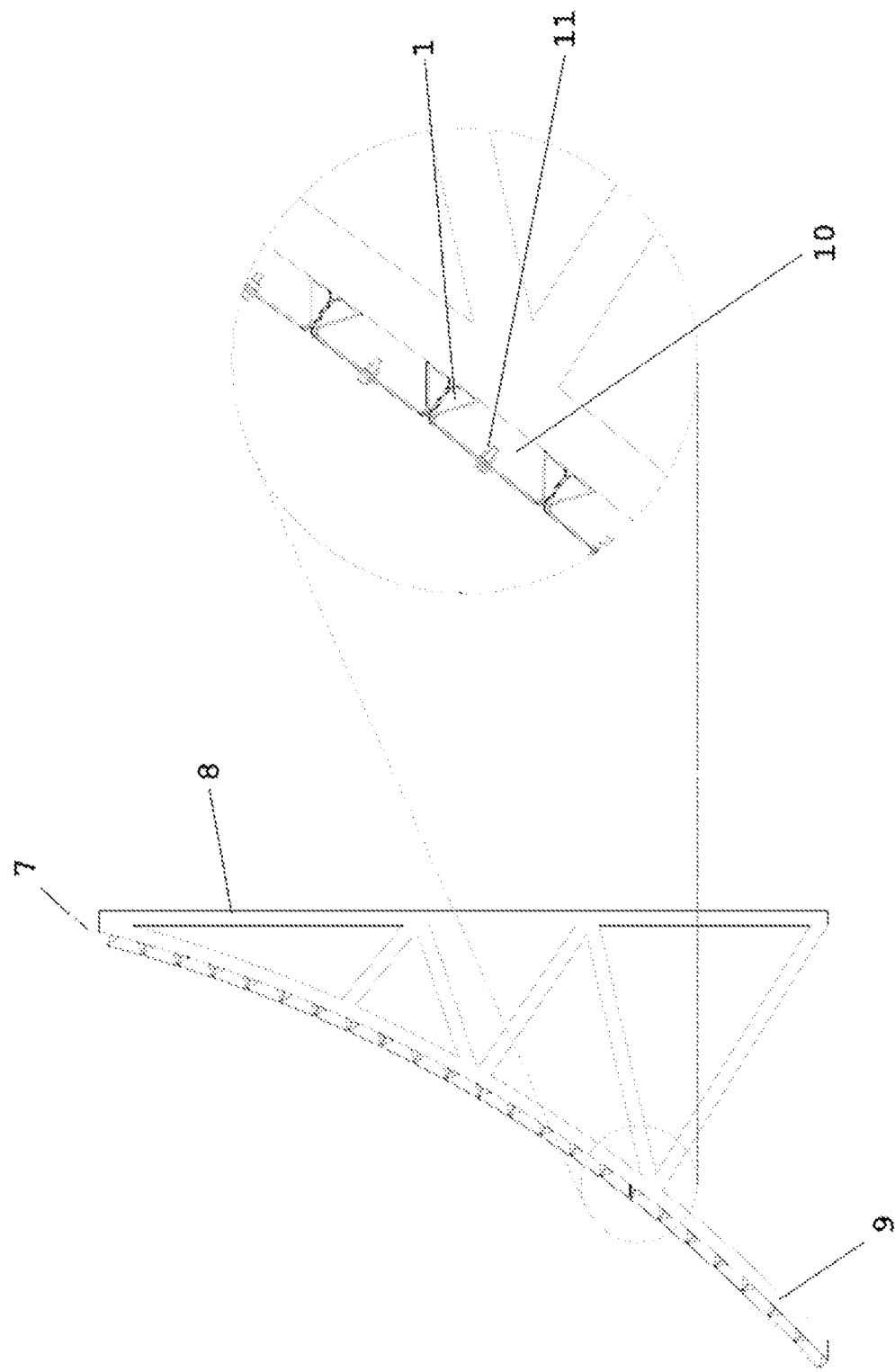
FIG. 4—side view representation of an embodiment of the jet blast deflector fence of the present invention. The reference signs represent:
1—sound insulating panel;
7—jet blast deflector fence.

8—vertical post;
9—rail channel;
10—rabbet;
11—fixation mechanism.

DETAILED DESCRIPTION

The more general and advantageous configurations of the present invention are described in the Summary of the invention. Such configurations are detailed below in accordance with other advantageous and/or preferred embodiments of implementation of the present invention.

In a preferred embodiment of the sound insulating panel of the present invention, it is comprised by a C-shaped sheet, with a central portion, having a perforated area, forming the front surface of the sound insulating panel, from which two lateral portions are perpendicularly projected. Each of said lateral projections comprises an inner brim at an opposite end, acting as locking element. The panel also comprises a capsule, designed to fit inside the C-shaped sheet, in the interior space defined by an inner surface of the central portion and by the lateral projections. The capsule is comprised by a rear sheet in which a sound insulator material is installed. It has a smaller length than the length of the central portion, being centrally placed inside the C-shaped sheet in such a way to be aligned with the perforated area of the central portion, and to form two hollow cavities of the same dimension at both ends of the C-shaped sheet for fixing purposes to the fence structure. The capsule is adapted to be inserted and removed from the inside of the C-shaped sheet through a locking mechanism provided by the inner brims of the lateral projections.

In one embodiment of the sound insulating panel of the present invention, combinable with the other embodiments described herein, the C-shaped sheet is made of galvanized steel or aluminium.

In another embodiment of the sound insulating panel of the present invention, combinable with the other embodiments described herein, at least 30% of the area of the C-shaped sheet's central portion is perforated, allowing the direct contact of the capsule's insulator material with the exterior.

In another embodiment of the sound insulating panel of the present invention, combinable with the other embodiments described herein, the capsule's sound insulator material is inert wool, made from polyester, glass or processed rock.

In another embodiment of the sound insulating panel of the present invention, combinable with the other embodiments described herein, the capsule is attached and positioned inside of the C-shaped sheet by rivets.

The present invention also describes a jet blast deflector fence comprised by a plurality of sound insulating panels as described above. In a preferred embodiment of the jet blast deflector it further comprises a deflector framework comprised of two structural members: a first member constituted of a plurality of vertical posts fixed to a base at its lower end, and a second member constituted of a plurality of rail channels, wherein an upper end of a rail channel is fixed to an upper end of a vertical post, and the rail channel projecting towards the base. Each rail comprises a plurality of rabbets, being each rabbet adapted to fit into an hallow cavity of a sound insulating panel. The distance between each two rail channels is such that it allows the insertion and removal of a sound insulating panel between them through a sliding movement. That configuration represents a major advantageous in what concerns to the maintenance of the fence and its constituting elements, due to harsh operating conditions caused especially by high temperatures or to damages in the event of impact of an aircraft, allowing an easy way to replace a panel or a set of panels according to the need, instead of replacing the entire deflection surface.

In another embodiment of the jet blast deflector fence of the present invention, combinable with the other embodiments described herein, the engagement between a rabbet and a hollow cavity of a sound insulating panel is complemented with a fixation mechanism, wherein the fixation mechanism can be a riveted or bolted connection.

In another embodiment of the jet blast deflector fence of the present invention, combinable with the other embodiments described herein, the rail channels have an equal number of rabbets and the rabbets of each rail channel are equally spaced between them and aligned horizontally in relation to the rabbets of adjacent rail channels.

In another embodiment of the jet blast deflector fence of the present invention, combinable with the other embodiments described herein, the rail channels have a concave-curved shape. Alternatively, the rail channels have a linear shape.

In another embodiment of the jet blast deflector fence of the present invention, combinable with the other embodiments described herein, a lower end of the rail channels is fixed to the base The technical features characterizing the jet blast deflector fence described herein allows its use in conjunction with a ground run-up enclosure structure.

As will be clear to one skilled in the art, the present invention should not be limited to the embodiments described herein, and a number of changes are possible which remain within the scope of the present invention.

Of course, the preferred embodiments shown above are combinable, in the different possible forms, being herein avoided the repetition all such combinations.

The invention claimed is:

1. A jet blast deflector fence comprising:
a plurality of sound insulating panels, each of said plurality of sound insulating panels suitable for use as a deflecting surface in jet blast deflectors, and comprising:
 a C-shaped sheet, with a central portion forming the front surface of the sound insulating panel, from which two lateral portions are perpendicularly projected; each of said lateral projections comprising an inner brim at an opposite end; the central portion having a perforated area;
 a capsule comprised by a rear sheet in which a sound insulator material is installed; the capsule being designed to fit inside the C-shaped sheet, in the interior space defined by an inner surface of the central portion and by the lateral projections;
 wherein, the capsule has a smaller length than the length of the central portion, being centrally placed inside the C-shaped sheet in such a way to be aligned with the perforated area of the central portion and to form two hollow cavities of the same dimension at both ends of the C-shaped sheet; and
 the capsule being adapted to be inserted and removed from the inside of the C-shaped sheet through a locking mechanism provided by the inner brims of the lateral projections;
a deflector framework comprised of two structural members; a first member constituted of a plurality of vertical posts fixed to a base at its lower end, and a second member constituted of a plurality of rail channels; an upper end of a rail channel being fixed to an upper end of a vertical post, the rail channel projecting towards the base;

wherein, each rail channel comprises a plurality of rabbets; each rabbet adapted to fit into an hallow cavity of a sound insulating panel;

the distance between each two rail channels is such that it allows the insertion of a sound insulating panel between them through a sliding movement.

2. The jet blast deflector fence of claim 1, wherein the C-shaped sheet is made of galvanized steel or aluminium.

3. The jet blast deflector fence of claim 1, wherein at least 30% of the area of the C-shaped sheet's central portion is perforated.

4. The jet blast deflector fence of claim 1, wherein the capsule's sound insulator material is inert wool made from polyester, glass or processed rock.

5. The jet blast deflector fence of claim 1, wherein capsule is attached and positioned inside of the C-shaped sheet by rivets.

6. The jet blast deflector fence according to claim 1, wherein the engagement between a rabbet and a hollow cavity of a sound insulating panel is complemented with a fixation mechanism.

7. The jet blast deflector fence according to claim 6, wherein the fixation mechanism is a riveted or bolted connection.

8. The jet blast deflector fence according to claim 1, wherein the rail channels have an equal number of rabbets; the rabbets of each rail channel being equally spaced between them and aligned horizontally in relation to the rabbets of adjacent rail channels.

9. The jet blast deflector fence according to claim 1, wherein the rail channels have a concave-curved shape.

10. The jet blast deflector fence according to claim 1, wherein the rail channels have a linear shape.

11. The jet blast deflector fence according to claim 1, wherein a lower end of the rail channels is fixed to the base.

12. A Ground run-up enclosure characterized by comprising a jet blast deflector fence of claim 1.

13. Use of the sound insulating panels of claim 1 in a jet blast deflector fence.

14. Use of the jet blast deflector fence of claim 1 in a Ground run-up enclosure.

* * * * *